United States Patent [19]

Rauscher, Jr.

[11] Patent Number: 5,441,219
[45] Date of Patent: Aug. 15, 1995

[54] METHOD FOR ATTACHING METALLIC TUBING TO NONMETALLIC PRESSURE VESSEL, AND PRESSURE VESSEL MADE BY THE METHOD

[75] Inventor: Robert A. Rauscher, Jr., Lawrenceville, N.J.

[73] Assignee: Martin Marietta Corporation, East Windsor, N.J.

[21] Appl. No.: 68,509

[22] Filed: May 27, 1993

[51] Int. Cl.6 .................. B65D 90/04; B64D 37/00
[52] U.S. Cl. ................... 244/135 R; 244/158 R; 220/457; 220/465; 220/562
[58] Field of Search ............ 244/158 R, 135 R; 220/454, 455, 457, 465, 562

[56] References Cited

U.S. PATENT DOCUMENTS

| | | | |
|---|---|---|---|
| 3,540,615 | 11/1970 | Paine | 220/454 |
| 3,979,005 | 9/1976 | Robinson et al. | 244/135 R |
| 4,431,697 | 2/1984 | Rolinski et al. | 244/117 A |
| 4,613,922 | 9/1986 | Bachmann | 361/215 |
| 4,696,398 | 9/1987 | Steinmetz, Jr. | 244/135 B |
| 4,765,507 | 8/1988 | Yavorsky et al. | 220/465 |
| 4,779,757 | 10/1988 | Fuckert | 220/457 |
| 4,785,955 | 11/1988 | Sasaki | 270/457 |
| 5,263,329 | 11/1993 | Grove et al. | 244/135 R |

FOREIGN PATENT DOCUMENTS 3837137 5/1990 Germany .......... 244/135 R

Primary Examiner—Andres Kashnikow
Assistant Examiner—Virna Lissi Mojica
Attorney, Agent, or Firm—W. H. Meise; C. A. Berard; S. A. Young

[57] ABSTRACT

A method for making a pressure tank includes procuring a metallic feed pipe (12) with a substantially cylindrical outer surface (312), a bore (21), and, at an attachment end thereof, an annular ring (350) protruding from the cylindrical outer surface. A dissolvable mandrel (410) in the shape of the desired tank or pressure vessel is made. The mandrel includes a neck portion (412, 414) dimensioned to fit within the bore of the feed pipe. If necessary, the outer surface of the mandrel is rendered electrically conductive, as for example by metal sputtering or evaporation, or by electroless deposition. A thin layer (328) of ductile metal is then electrolytically deposited over the outer surface of the mandrel, extending onto the outer surface of the feed pipe in the pipe-to-tank coupling region, closely fitting over the annular ring, to thereby form a tank liner. A composite reinforcing shell (322) is formed around the liner, and extending over the liner in the coupling region. Thereafter, a solvent is applied to dissolve the mandrel. In a particular embodiment, the ductile metal is copper, the metallic pipe is steel, and the composite material is graphite-fiber reinforced epoxy, applied in the form of a yarn, tow or tape which may be preimpregnated with partially cured epoxy resin, or which if not preimpregnated, is impregnated during winding. The epoxy is cured to form the reinforcing shell. A spacecraft includes a thruster engine, a tank as described, and interconnecting plumbing.

7 Claims, 4 Drawing Sheets

METHOD FOR ATTACHING METALLIC TUBING TO NONMETALLIC PRESSURE VESSEL, AND PRESSURE VESSEL MADE BY THE METHOD

This invention relates to strong, lightweight pressure vessels generally useful for storage of fluids, and especially adapted for, in a spacecraft, storage of gases and liquids under pressure. More specifically, the invention relates to arrangements for affixing metallic tubing to nonmetallic pressure vessels.

Composite materials such as fiber-reinforced resins have been found to be noncorrosive, and to provide great strength for their weight. Composite materials such as fiberglass-reinforced epoxy have found wide use for in-ground gasoline storage tanks and swimming pools, and for other uses such as boat hulls and automobile body parts. Such tanks, hulls and auto-body parts may be made by lining a mold with fiberglass cloth, followed by impregnation with a resin, and curing. When such tanks are to be connected to a fill or drain pipe, it is common to thread the interior of an aperture in the tank, and to attach a pipe by screwing it into the threaded aperture, using pipe dope, polymer tape sealant, or the like to provide a fluid-tight seal.

Such tanks may be required to contain fuel, oxidizer, or a monopropellant such as hydrazine (together referred to as propellants). Such tanks are ordinarily pressurized with a gas such as helium or nitrogen when the propellant is to be used, and are not thereafter depressurized until the propellant is exhausted. The helium pressurant must also be contained in a tank. Some spacecraft may have a design lifetime of ten or more years. Therefore, the propellant and pressuring gas tanks must hold pressure without leaking for a long period of time. Spacecraft require extremely lightweight, reliable components. Metal tanks with welded joints become impractical as the tank material becomes thinner due to weight conservation measures, because foil-thickness metals cannot be reliably welded. It has been found that graphite fiber reinforced epoxy is a desirable construction material for spacecraft propellant tanks because of its strength and low weight. A thin metal liner may be used to reduce leakage due to porosity of the composite. It is believed that threaded pipe joints undesirably cut the reinforcing fibers, or may work loose under the vibration attendant upon vehicle launch, or due to pressure and/or temperature cycles experienced during orbital life. An improved pressure-vessel-to-feed-pipe connecting arrangement is desired.

SUMMARY OF THE INVENTION

According to the invention, a metallic feed pipe with a substantially cylindrical outer surface and a bore is prepared, by welding onto the pipe, or otherwise forming, with an annular ring protruding from the cylindrical outer surface of the pipe. A dissolvable mandrel in the shape of the interior volume of the desired tank or pressure vessel is made. The mandrel includes a neck portion dimensioned to fit within the bore of the feed pipe. If necessary, the outer surface of the mandrel is rendered electrically conductive, as for example by metal sputtering or evaporation, or by electroless deposition. A thin layer of ductile metal is then electrolytically deposited over the outer surface of the mandrel, extending onto the outer surface of the feed pipe in the pipe-to-tank coupling region, closely fitting over the annular ring, to thereby form a tank liner. A composite reinforcing shell is formed around the liner, and extending over the liner in the tank-to-pipe coupling region. Thereafter, a solvent is applied to dissolve the mandrel. In a particular embodiment, the ductile metal is copper, the metallic pipe is steel, and the composite material is graphite-fiber reinforced epoxy, applied in the form of a yarn or tow which may be preimpregnated with partially cured epoxy resin, or which, if not preimpregnated, is impregnated during winding. The epoxy is cured to form the reinforcing shell. The tank so made is attached to a spacecraft body and plumbed to an engine in one embodiment of the invention.

DESCRIPTION OF THE INVENTION

Figure 1:
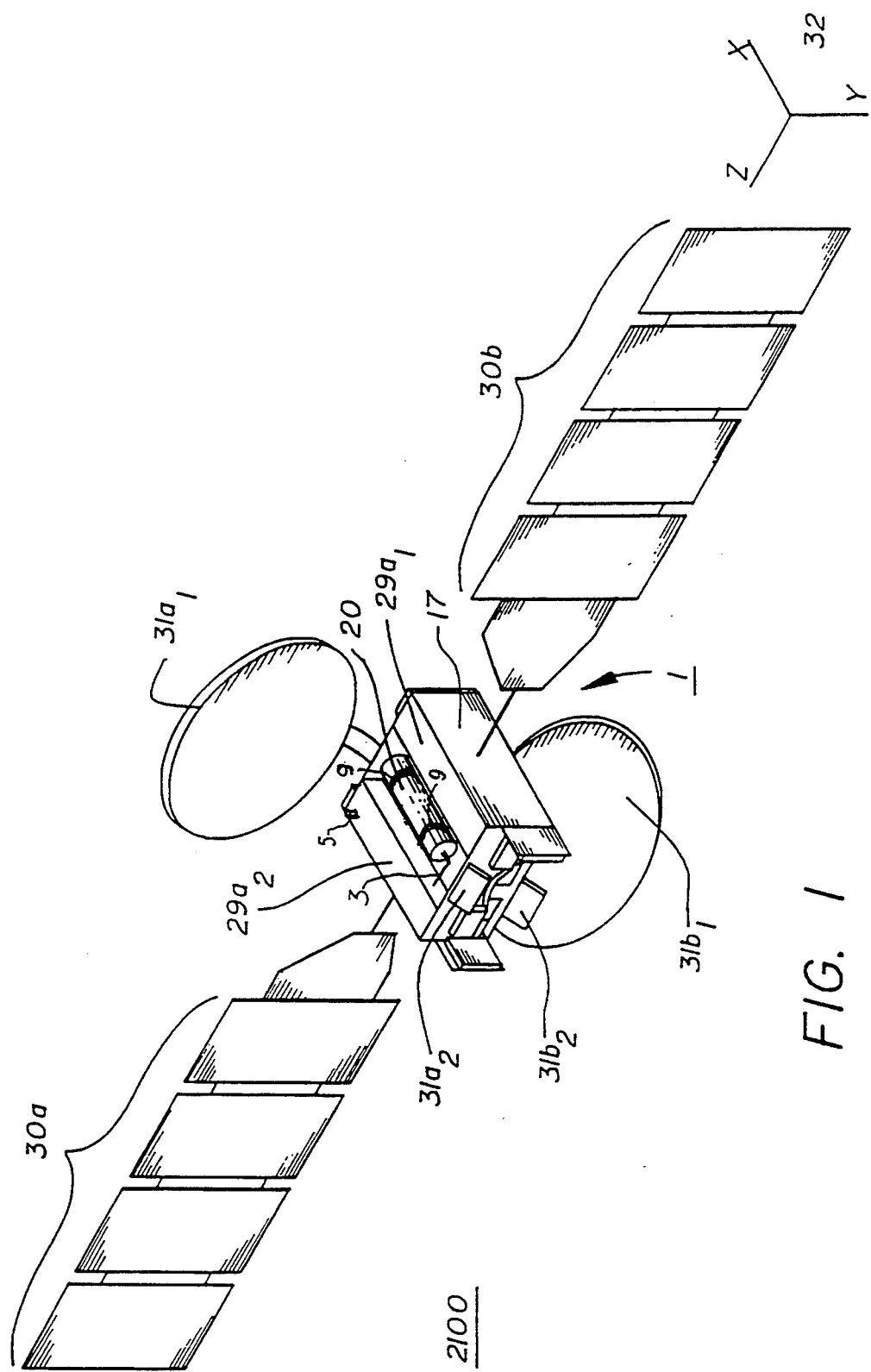
FIG. 1 illustrates a spacecraft and a tank according to the invention.

FIG. 1 illustrates a spacecraft designated generally as A2100, as described in copending patent application Ser. No. 07/048,230, filed Sep. 28, 1992 in the name of Homer et al. As described therein, spacecraft A2100 includes unfurled four-section solar panels designated 30a and 30b, a body designated generally as 1, including access panels 29a1 and 29a2, a propellant tank 20 held in place by straps 9, and a first antenna system including dual-polarization reflector 31a1 and its feed 31b1, and second antenna system reflector 31b1 and its feed 31b2. Spacecraft A2100 of FIG. 1 may additionally include other propellant and/or pressuring gas tanks, not visible in FIG. 1. Spacecraft A2100 also includes a plurality of engines or thrusters, one of which is illustrated as 5, which is connected by spacecraft plumbing, illustrated as 3 in FIG. 1 to propellant tanks, including tank 20 of spacecraft A2100.

Figure 2:
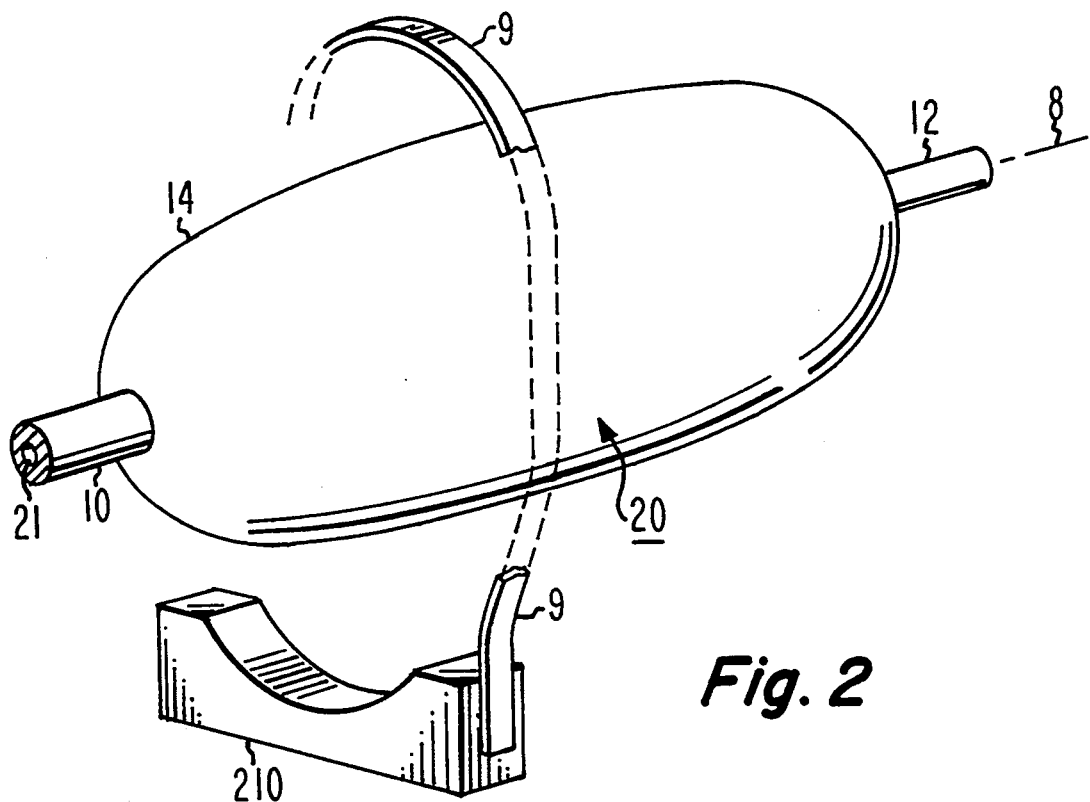
FIG. 2 is a simplified perspective or isometric view of a tank and feed pipe according to the invention.

FIG. 2 is a perspective or isometric view of a propellant or pressuring gas tank according to the invention, which may be used in spacecraft A2100 of FIG. 1. In FIG. 2, body 14 of tank 20 is affixed to first and second feed pipes 10 and 12, which provide access by means of bores, one of which is designated 21, to the interior of the tank. As described in more detail below, the visible portion of tank body 14 is of a fiber-reinforced epoxy composite material.

FIG. 2 also shows one possible arrangement including a saddle and strap for holding tank 20 to body 1 of spacecraft A2100 of FIG. 1. In FIG. 2, a saddle 210 is adapted to be mounted on body 1 and incudes a surface curved to fit tank 20, and also holds retaining strap 9.

Figure 3:
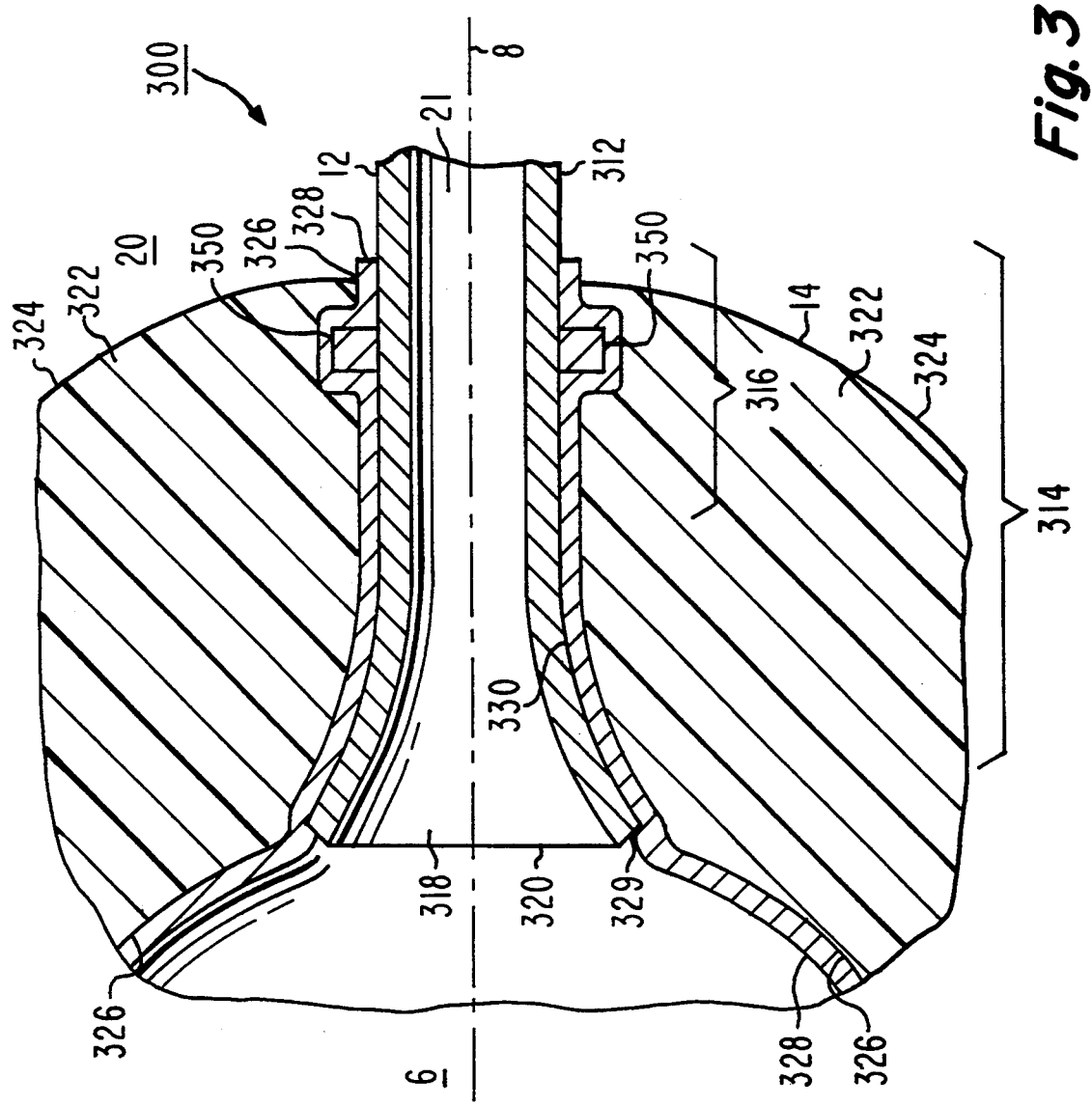
FIG. 3 is a simplified cross-sectional view of the attachment or coupling between the tank and feed pipe of FIG. 2.

FIG. 3 is a cross-section of the attachment, designated generally as 300, of pipe 12 of FIG. 2 to tank 14. The tank cavity is to the left in FIG. 3 and is designated generally as 6. As illustrated, pipe 12 defines a longitudinal axis 8 and a bore 21. The outer surface of pipe 12 is designated 312. As illustrated, pipe 12 is attached to tank body 14 over an attachment region 314. Within attachment region 314, pipe 12 includes a portion 316 in which the outer surface is generally cylindrical, and also includes a flare 318. Pipe 12 ends at the large end 320 of flare 318.

An annular steel ring 350 is welded to outer surface 312 of pipe 12 in cylindrical portion 316 of attachment region 314 of pipe 12 to tank body 14.

In the cross-section of FIG. 3, body 14 of tank 20 may be seen to be principally composed of graphite-epoxy composite material 322. Tank body 14 has an outer surface 324, and an inner surface 326 which is in intimate contact with a thin, ductile metal tank liner 328. In a prefer-red embodiment, the metal is copper. Copper tank liner 328 extends over the inner surface 326 of composite tank body 14, and includes a neck portion 330 which extends between composite body 14 and the combination of pipe 12 and annular ring 350, and is exposed where pipe 12 enters tank body 14. The structure as so far described is constructed as described below in conjunction with FIGS. 4a–4d.

Pipe-to-tank attachment 300 as described resists relative longitudinal motion of pipe 12 relative to tank body 14. Forces tending to push the pipe into the tank react against annular ring 350, and pressure within the tank tending to push the pipe out of the tank reacts against flare 318 and annular ring 350. It has been discovered that, for the conditions encountered in spacecraft, the flare may not be necessary, and that the annular ring with the plated-on liner may be sufficient.

Figure 4A:
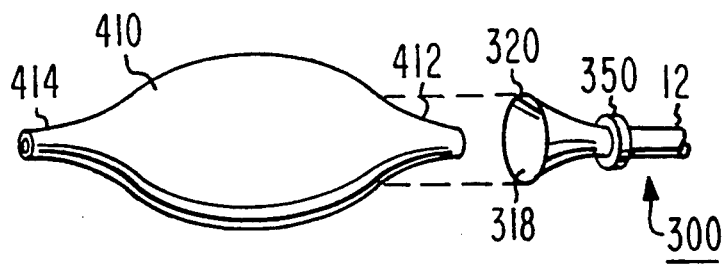
FIGS. 4a–4d illustrate steps in the fabrication of the tank and feed pipe attachment of FIGS. 2 and 3.
Figure 4B:
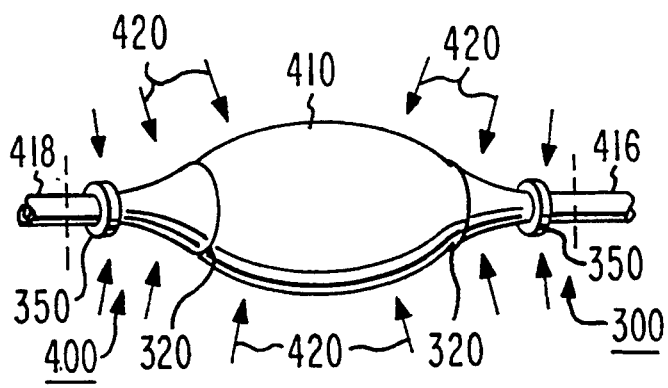

FIGS. 4a–4d illustrate steps in the fabrication of a tank such as that of FIGS. 2 and 3. Elements of FIGS. 4a–4d corresponding to those of FIGS. 1, 2, or 3 are designated by like reference numerals. FIG. 4a illustrates a mandrel 410 made from polyester polycarbonate (LEXAN), which is solvent soluble with methylene chloride or acetone. Mandrel 410 has the desired volume and shape of the inside of the tank to be fabricated. the attachment ends 412, 414 of mandrel 410 are dimensioned to fit within flare 318 and bore 22 of attachment 300 of pipe 12 of FIGS. 1 and 2. The exterior surface of mandrel 410 of FIG. 4a may be flashed with a conductive material so that later electroplating steps may be performed. The flashing with a conductive material may be by sputtering, metal evaporation, or electroless deposition. FIG. 4b illustrates mandrel 410 with a pipe attachment 300 of FIG. 3 at the right, and with a second pipe attachment 400, identical to attachment 300 of FIG. 3, at the left, each fitted over the attachment ends 412, 414 of mandrel 410, with intimate contact between lip region 329 and the mandrel, to allow coating over the edge at a later step of manufacture. As mentioned, the attachments 412 may dispense with the flare, if desired, which allows simpler manufacture. If flashing of the outer surface of mandrel 410 was not performed in conjunction with FIG. 4a, flashing is now performed over the pipe attachments 412 and the exposed portion of mandrel 410, as suggested by arrows, some of which are designated 420 in FIG. 4b. Pipe regions 416 and 418, delimited by dash lines, are masked or protected, so as not to be coated with conductive material, to provide a region clear of unwanted material so that pipe regions 416 and 418 may be welded for attaching further pipes thereto.

Figure 4C:
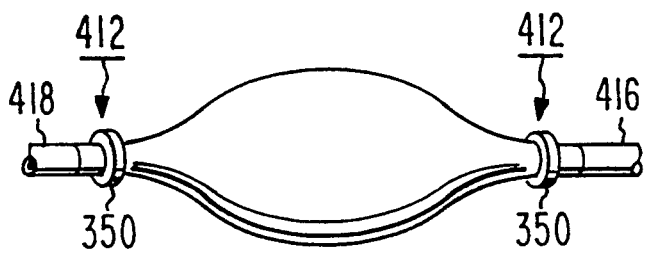

FIG. 4c represents the result of an electroplating operation by which a ductile metal is plated onto the exterior of the mandrel, and the exterior of pipe attachments 300 and 400, including their annular rings 350, but excluding those pipe portions 416, 418 which are kept free from plating to allow better welding. As a result of the plating operation represented by FIG. 4c, the junctions of the edges 320 of the flares of the pipe attachments 300 and 400 are no longer visible, being covered by a layer of metal. In a preferred embodiment intended for the storage of inert gases, the metal is copper, applied to a thickness of 0.004 to 0.006 inches. The metal coating is then inspected.

Figure 4D:
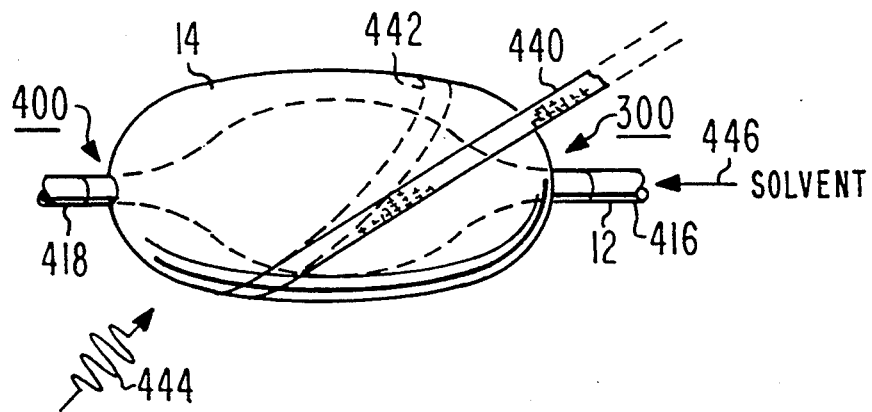

FIG. 4d represents a plated tank as in FIG. 4c, toward the end of a process of winding with epoxy preimpregnated (prepreg) reinforcing fiber yarn or tow. The fiber reinforcement is illustrated as 440, which is being laid along a path 442 illustrated by dash lines, to form composite tank body 14. The windings are impregnated with epoxy during the winding process if the fiber yarn was not preimpregnated, following which the epoxy is cured. Curing may be performed by application of heat, represented in FIG. 4d by photon symbol 444. When the composite body 14 is cured, a solvent is applied through pipe 12, as suggested by arrow 446 in FIG. 4d, to dissolve the mandrel, leaving a cavity (6 of FIG. 3) in the original shape of the mandrel. Methylene chloride or acetone are suitable solvents for the polycarbonate form of polyester.

Consideration was given to forming a similar structure by a somewhat different alternate method, involving making a mandrel with attachment ends 412 and 414 as in FIG. 1, fitting the pipe attachments 300 and 400 thereto, and flashing, all as described in FIGS. 4a and 4b. The next following step of the alternate method, however, involves forming the reinforcing body about the mandrel, and curing if necessary. The solvent is then applied to dissolve and remove the mandrel, forming a tank exterior with an electrically conductive cavity. A plating solution is then flowed through the tank, with a plating wire electrode extending through the tank, to electroplate the ductile metal onto the interior of the tank, over the edge (320 of FIG. 4a) of the flare, and onto the interior of the bore, rather than onto the exterior, of the pipe attachments 300 and 400. While the structure resulting from this alternate method is very similar to that of FIG. 3, the alternate method has the disadvantage that the ductile metal liner cannot easily be inspected, because of the presence of the opaque cured composite reinforcement.

After the tank and its attachments are completed, it may be tested under pressure. The completed tank may be installed in spacecraft A2100 of FIG. 1, held in place, for example, by the saddle-type clamping scheme illustrated as FIG. 2. Pipe 12 of attachment 300 is then welded to a corresponding terminus of the spacecraft plumbing 3, for ultimate connection to engine 5 of FIG. 1.

While a saddle clamp is described for holding the tank to the spacecraft, the preferred embodiment uses projecting supports which may be interwound into the composite tank body.

Other embodiments of the invention will be apparent to those skilled in the art. For example, annular ring 350 may be formed integral with pipe 12 by machining from a block of metal or from a pipe no smaller in diameter than the diameter of the ring, or the ring may be brazed on, or even built up on the exterior of the pipe by electrodeposition. Instead of winding with fiber tape, the composite reinforcing exterior may be made by spraying onto the prepared mandrel illustrated in FIG. 4c a mixture of liquid epoxy filled with chopped fiber reinforcement material. As a further alternative, the mandrel could be wound with a reinforcing fiber cloth, followed by impregnation and curing. While a tank with two pipe attachments is described, the invention may be used with one, or with three or more attachments, and may be used on all or fewer than all of the pressure tanks of a spacecraft. Chemical compatibility of the inner metal liner with the fluid intended to be stored must also be carefully considered. While fiber yarn or tow reinforcement has been described, tape may be used. In some applications, it may be possible to impregnate the fiber reinforcement with epoxy resin after winding, by placing the wound tank in a vacuum chamber, evacuating the chamber, filling the chamber with liquid resin, and re-pressurizing the chamber.

What is claimed is:

1. A tank including a cavity for storing a fluid, said tank comprising:

an elongated metal feed pipe defining a longitudinal axis, an outer surface and a bore, said pipe including a coupling portion near one end thereof, said coupling portion including a substantially cylindrical outer surface, said coupling region also including an annular ring integral with said cylindrical outer surface and protruding radially from said cylindrical outer surface;

a thin, ductile metal tank liner defining said cavity, and also defining an elongated neck portion extending over and around said coupling portion of said pipe, and closely fitted about said annular ring; and a composite reinforcing outer shell closely fitted about said liner, and extending over said neck portion and coupling region in a manner to, in said coupling region, sandwich said liner between said feed pipe, including said integral annular ring, and said outer shell.

2. A tank according to claim 1, wherein the material of said liner is copper, and the material of said outer shell is graphite-fiber reinforced epoxy resin.

3. A tank according to claim 1, wherein said feed pipe further comprises a flared portion extending from a point between said annular ring and said one end toward said one end.

4. A spacecraft comprising a tank defining a cavity for storing an expendable fluid, said spacecraft comprising:

a body;

an engine mounted on said body;

an elongated metal feed pipe defining a longitudinal axis, an outer surface and a bore, said pipe including a coupling portion near one end thereof, said coupling portion including a substantially cylindrical outer surface, said coupling region also including an annular ring integral with said cylindrical outer surface and protruding radially outward from said cylindrical outer surface;

a thin, ductile metal tank liner defining said cavity, and also defining an elongated neck portion extending over and around said coupling portion of said pipe, and closely fitted about said annular ring;

a composite reinforcing outer shell closely fitted about said liner, and extending over said neck and coupling region in a manner to, in said coupling region, sandwich said liner between said feed pipe, including said integral annular ring, and said outer shell;

attachment means coupled to said body and said tank for holding said body and said tank together; and a plumbing system interconnecting said feed pipe of said tank with said engine.

5. A spacecraft according to claim 4, further comprising:

a propellant or pressurant fluid contained in said cavity.

6. A tank according to claim 1, further comprising:
a spacecraft body;
an engine mounted on said body for consuming propellant supplied thereto while imparting a velocity change to said spacecraft body;
attachment means coupled to said body and to said tank for holding said body and said tank together; and
a plumbing system interconnecting said feed pipe of said tank with said engine, whereby propellant stored in said tank may be supplied to said engine for being consumed thereby.

7. A tank according to claim 6, further comprising:
one of a propellant or pressurant fluid contained in said cavity.

* * * * *